US009594155B2

(12) United States Patent
Cashler et al.

(10) Patent No.: US 9,594,155 B2
(45) Date of Patent: Mar. 14, 2017

(54) VEHICLE RADAR SYSTEM WITH TRAILER DETECTION

(71) Applicant: DELPHI TECHNOLOGIES, INC., Troy, MI (US)

(72) Inventors: Robert J. Cashler, Kokomo, IN (US); Walter K. Kosiak, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 350 days.

(21) Appl. No.: 14/454,754

(22) Filed: Aug. 8, 2014

(65) Prior Publication Data

US 2016/0041258 A1    Feb. 11, 2016

(51) Int. Cl.

| G01S 13/04 | (2006.01) |
|---|---|
| G01S 7/41 | (2006.01) |
| G01S 7/521 | (2006.01) |
| G01S 13/72 | (2006.01) |
| G01S 13/93 | (2006.01) |
| G01S 13/88 | (2006.01) |

(52) U.S. Cl.
CPC ............. *G01S 7/411* (2013.01); *G01S 7/521* (2013.01); *G01S 13/04* (2013.01); *G01S 13/726* (2013.01); *G01S 13/88* (2013.01); *G01S 13/931* (2013.01); *G01S 2013/9332* (2013.01); *G01S 2013/9375* (2013.01); *G01S 2013/9378* (2013.01); *G01S 2013/9385* (2013.01)

(58) Field of Classification Search
CPC ...... G01S 13/583; G01S 13/86; G01S 13/865; G01S 17/023; G01S 17/89; G01S 2013/9314; G01S 7/411
USPC .......................................................... 342/44
See application file for complete search history.

(56) References Cited

U.S. PATENT DOCUMENTS

| 5,717,390 | A | 2/1998 | Hasselbring |
| 7,786,849 | B2 * | 8/2010 | Buckley ................. G08G 1/165 |
| | | | 180/271 |
| 8,073,594 | B2 | 12/2011 | Lee et al. |
| 2005/0068197 | A1 | 3/2005 | Regan |
| 2014/0005892 | A1 | 1/2014 | Baer et al. |
| 2015/0353127 | A1 | 12/2015 | Takeda |

FOREIGN PATENT DOCUMENTS

| DE | 10 2012 017668 A1 | 3/2014 |
| EP | 1 749 730 A2 | 2/2007 |
| JP | 2010 036645 A | 2/2010 |
| WO | 2014/109151 A1 | 7/2014 |

* cited by examiner

*Primary Examiner* — Timothy A Brainard
(74) *Attorney, Agent, or Firm* — Lawrence D. Hazelton

(57) ABSTRACT

A radar object detection system includes a radar sensor and a controller. The radar sensor is configured to emit a radar signal toward a defined area proximate to the vehicle, and output a reflection signal indicative of a detected target present in the defined area. The controller is configured to receive the reflection signal from the radar sensor, determine if the detected target corresponds to a trailer towed by the vehicle, and define an exclusion zone characterized as occupied by the trailer and thereby excluded from the defined area where objects can be detected.

5 Claims, 4 Drawing Sheets

VEHICLE RADAR SYSTEM WITH TRAILER DETECTION

TECHNICAL FIELD OF INVENTION

This disclosure generally relates to a vehicle radar system, and more particularly relates to a system that determines if a detected target corresponds to a trailer towed by the vehicle, and defines an exclusion zone that is occupied by the trailer and thereby excluded from a defined area where objects can be detected.

BACKGROUND OF INVENTION

It is known to equip a host vehicle with a radar system for detecting objects such as other vehicles proximate to the host vehicle. Such object detection is desirable for detecting, for example, other vehicles in the so called blind spot which is not readily observable by an operator of a vehicle using typical side-view and rear-view mirrors. Such object detection may also be useful to warn the operator of a rapidly approaching vehicle in an adjacent lane if the operator indicates that a lane-change is about to be executed by, for example, activating a turn-signal indicator, or for detecting objects behind the host vehicle when backing-up. If the host vehicle is towing a trailer, reflections of radar signals by the trailer system may interfere with the detection of a target that does not correspond to or is not associated with the trailer.

SUMMARY OF THE INVENTION

In accordance with one embodiment, a radar object detection system configured to detect objects proximate to a vehicle is provided. The system includes a radar sensor and a controller. The radar sensor is configured to emit a radar signal toward a defined area proximate to the vehicle, and output a reflection signal indicative of a detected target present in the defined area. The controller is configured to receive the reflection signal from the radar sensor, determine if the detected target corresponds to a trailer towed by the vehicle, and define an exclusion zone characterized as occupied by the trailer and thereby excluded from the defined area where objects can be detected.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Described herein is an improvement to vehicle radar systems that are used to detect objects such as other vehicles that are close to or approaching the host vehicle on which the radar system is installed. The improvement is related to detecting that the host vehicle is towing a trailer, and determining the size of the trailer so that radar system can more readily discriminate detected targets that correspond to (i.e. are associated with) the trailer from detected targets that do not correspond to the trailer. The trailer size information may also be used to, for example, adjust expected vehicle dynamic characteristics, and thereby compensate for the extra load presented by the trailer.

Figure 1:
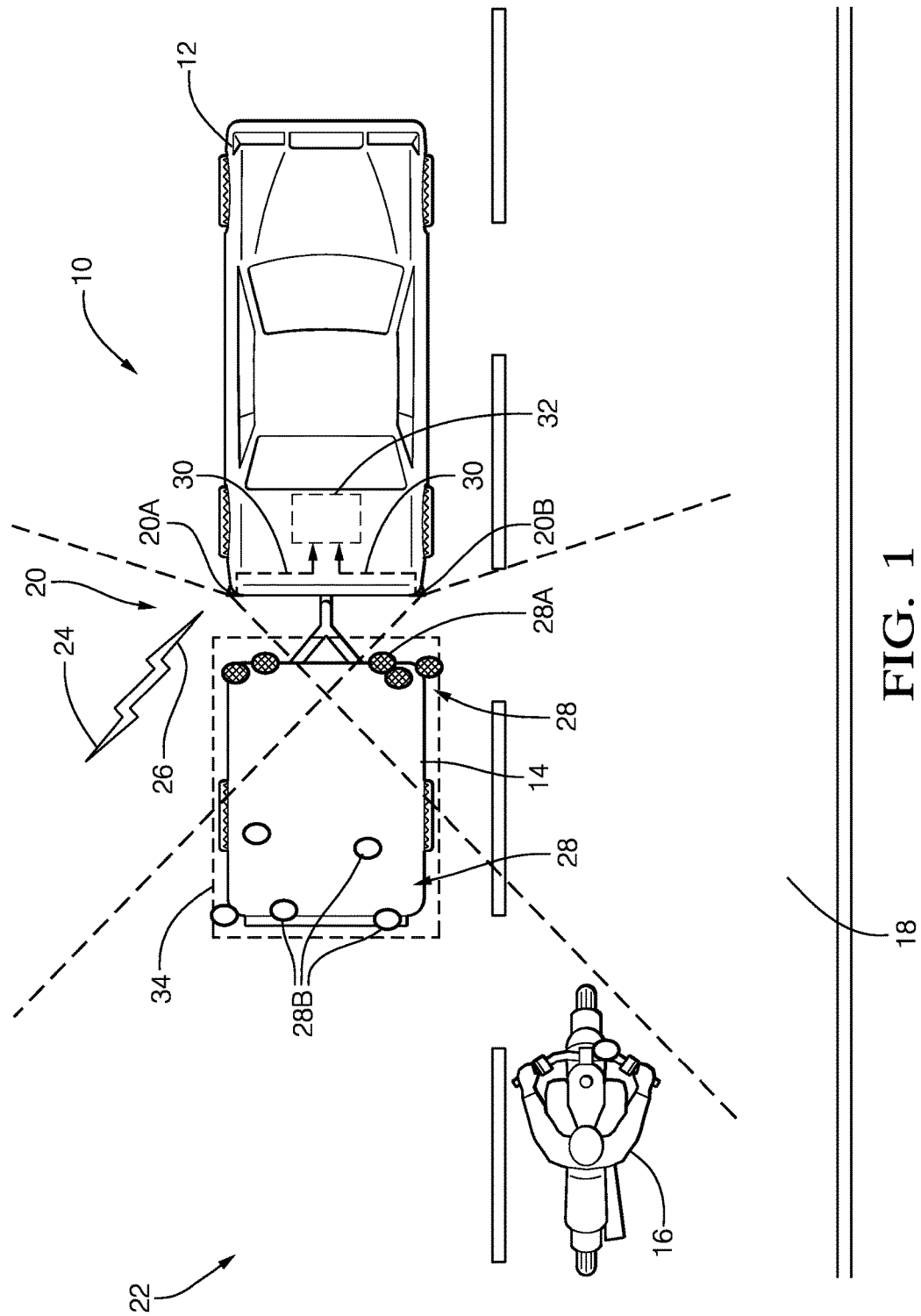
FIG. 1 is a top view of a vehicle equipped with a radar object detection system and towing a trailer in accordance with one embodiment.
Figure 2:
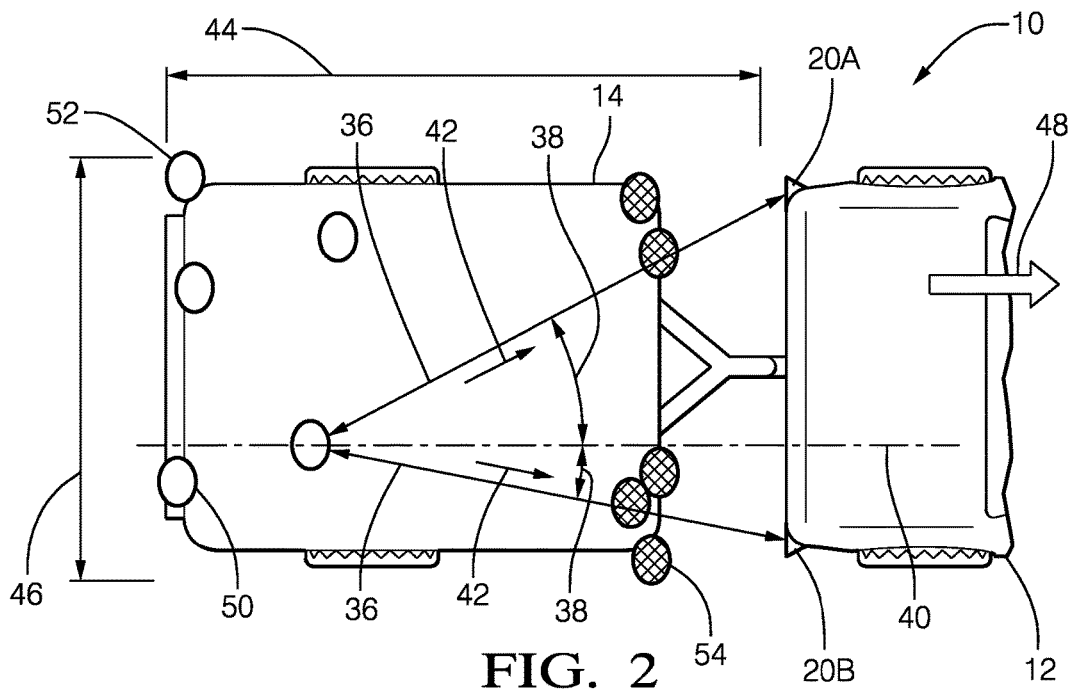
FIG. 2 is close-up of FIG. 1 in accordance with one embodiment.

FIGS. 1 and 2 illustrate a non-limiting example of a radar object detection system, hereafter referred to as the system 10. The system 10 is generally configured to detect objects proximate to a vehicle 12 equipped with the system 10. As will be described in more detail below, the system 10 is an improvement over prior radar systems because the system 10 is configured to determine the presence and size of a trailer 14 so the system 10 is able to, for example, better discriminate the trailer 14 from other objects such as a motorcycle 16 traveling in a traffic lane 18 adjacent to the lane occupied by the vehicle 12.

The system 10 includes a radar sensor 20 configured to emit a radar signal 24 toward a defined area 22 proximate to the vehicle 12, and detect a reflected signal 26 arising from the radar signal 24 being reflected by detected targets 28. When the trailer 14 is being towed, there will generally be some consistent reflected signals created from strong targets 28A such as the front of the trailer or other highly reflective objects such as wheel wells or fenders of the trailer; and some intermittent reflected signals from weak targets 28B such as the back bumper of the trailer 14 (or the motorcycle 16). Reflected signals from the weak targets 28B may be, for example, a multi-path reflection from under the trailer 14 as the signal bounces between the trailer 14 and ground, or by multi-path reflections traveling through a grated open trailer or cross frame members of the frame of the trailer.

In this non-limiting example, the radar sensor 20 includes a left sensor 20A and a right sensor 20B. A radar sensor system with a similarly configured radar sensor is available from Delphi Inc. of Troy, Mich., USA and marketed as an Electronically Scanning Radar (ESR) or a Rear-Side Detection System (RSDS). It is contemplated that the teachings presented herein are applicable to radar system with one or more sensor devices.

The radar sensor 20 is generally configured to output a reflection signal 30 that may include data indicative of a detected target 28 present in the defined area 22. Data that corresponds to the strong targets 28A will generally be from consistent, non-intermittent signals. However, data that corresponds to the weak targets 28B may be intermittent or have some substantial variability due to a low signal-to-noise ratio.

By way of example and not limitation, the radar sensor 20 may be configured to output a continuous or periodic data stream that includes a variety of signal characteristics associated with each target detected. The signal characteristics may include, but are not limited to a range 36 (FIG. 2) to the detected target 28 from the vehicle 12, an angle 38 to the detected target 28 relative to a longitudinal axis 40 of the vehicle 12, an amplitude (not shown) of the reflected signal 26, and a relative rate 42 of closure relative to the detected target 28. A target is generally detected because the reflected signal 26 from the detected target 28 has sufficient signal strength to meet some predetermined threshold. That is, there may be targets that reflect the radar signal 24, but the strength of the reflected signal 26 is insufficient to be characterized as one of the detected targets 28.

The system 10 may include a controller 32 configured to receive the reflection signal 30 from the radar sensor 20. The controller 32 may include a processor (not shown) such as a microprocessor or other control circuitry such as analog and/or digital control circuitry including an application specific integrated circuit (ASIC) for processing data as should be evident to those in the art. The controller 32 may include memory, including non-volatile memory, such as electrically erasable programmable read-only memory (EEPROM) for storing one or more routines, thresholds and captured data. The one or more routines may be executed by the processor to perform steps for determining if signals received by the controller 32 indicate the presence of objects as described herein. The controller 32 may also be configured to receive vehicle related data (not shown) such as vehicle speed, yaw rate, and transmission gear.

The controller 32 is generally configured to determine if the reflection signal 30 arising from the detected target 28 corresponds to (i.e. is associated with) a trailer being towed by the vehicle 12. That is, the controller 32 determines if the trailer 14 is present, so is actually being towed by the vehicle 12. The controller 32 is also generally configured to define an exclusion zone 34 characterized as occupied by the trailer 14 and thereby excluded from the defined area 22 where objects can be detected. By defining the portion of the defined area 22 that is the exclusion zone 34, the controller can more readily determine if what seems to be a new target is likely from the trailer 14, or is likely from something other than the trailer 14, such as the motorcycle 16.

The reflection signal 30 may be analyzed to categorize the data from each detected target with respect to a list of previously detected targets having established tracks. As used herein, a track refers to one or more data sets that have been associated with a particular one of the detected targets 28. By way of example and not limitation, if the amplitude of the reflected signal 26 indicated in the reflection signal is above a predetermined amplitude threshold, then the controller 32 determines if the data corresponds to a previously detected target or if a new target has been detected. If the data corresponds to a previously detected target, the data is added to or combined with prior data to update the track of the previously detected target. If the data does not correspond to any previously detected target because, for example, it is located too far away from any previously detected target, then it may be characterized as a new target and assigned a unique track identification number. The identification number may be assigned according to the order that data for a new detected target is received, or may be assigned an identification number according to a grid location in the defined area 22.

Since the expectation is that a detected target or a track that corresponds to (i.e. is associated with) the trailer 14 would have a relative rate 42 near zero, and that this condition would persist for an extended period of time. That is, the detected target 28 corresponds to the trailer 14 if a range 36 to the detected target 28 varies less than a variation threshold (e.g. less than 0.25 meters) for greater than a time threshold (e.g. greater than 5 seconds). It is noted that characterizing a target as having a relative rate near zero and having a variation in range less than a variation threshold are effectively the same characterization. As such, references to the term 'range rate' in the discussion that follows are directly comparable to the terms 'relative rate' and 'variation in range'.

Figure 3:
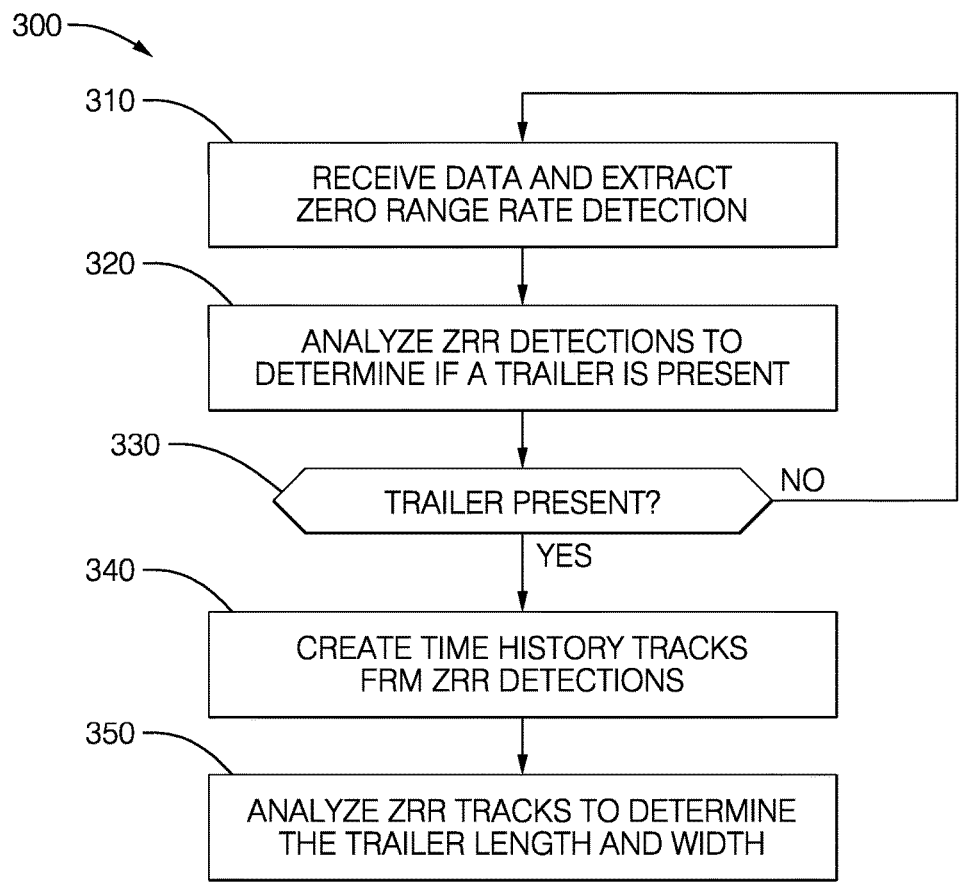
FIG. 3 is flowchart of a method executed by the system of FIG. 1 in accordance with one embodiment.

FIG. 3 illustrates a non-limiting example of a method 300 that is an overview of a process carried out by the controller 32 to determine the presence and size of the trailer 14.

Step 310, RECEIVE DATA AND EXTRACT ZERO RANGE RATE DETECTIONS, may include the controller the controller 32 comparing the relative rate 42 of a track to a threshold near zero, 0.25 meters/second for example. If the absolute value of the relative rate 42 is less that the threshold, the track is selected as a potential candidate of a detected target 28 that corresponds to the trailer 14. In addition, after the Zero Relative Rate or Zero Range Rate (ZRR) detections are extracted, the detection coordinates may be translated from the origins of the radar sensor 20 to a common origin centered at the rear center of the vehicle 12. This would allow for easy combining of detections of the detected target 28 by both the left sensor 20A and the right sensor 20B. The polar coordinates (the range 36 and the angle 38) from the detections may be translated to Cartesian coordinates in order to facilitate calculating a length 44 and a width 46 of the trailer 14. In order to conserve on memory requirements for the controller 32, the total number of ZRR detections may be limited to, for example, sixty-four.

Step 320, ANALYZE ZZR DETECTIONS TO DETERMINE IF A TRAILER IS PRESENT, may include counting the number of ZRR detections seen in a portion of the defined area 22 where a trailer could be when the present speed 48 of the vehicle 12 is greater than a speed threshold such as five kilometers per hour (5 kph). For example, the detected target 28 corresponds to the trailer 14 if the range 36 is less than a maximum distance threshold such as sixteen meters (16 m). Accordingly, the controller 32 may be configured to determine if the detected target 28 corresponds to the trailer 14 only when the present speed 48 of the vehicle 12 is greater than the speed threshold.

If the number of Zero Relative Rate or Zero Range Rate (ZRR) detections exceeds a count threshold, four detections for example, and the number of ZRR detections is persistent greater than some period of time, two second for example while the present speed 48 is greater than the speed threshold, a trailer presence may be determined. Similarly, if no ZRR detections are detected for a period of time, five seconds for example, while the vehicle 12 is moving at a sufficient speed, the absence of a trailer is determined. Until one or the other condition is met the trailer presence status is unknown. Once the trailer presence is determined, it may remain present or not present until the vehicle stops and the selected transmission gear is Park. Values for the bounded area that a trailer might occupy, the speed threshold, the minimum number of ZRR detections for a trailer to be determined present, and other thresholds described herein are generally are also set using engineering judgment or by empirical testing.

Step 330, TRAILER PRESENT?, directs the logic path of the method 300 based on the outcome of the determination of whether or not a trailer is being towed by the vehicle 12. If no trailer is detected (NO), the system 10 continues to try and detect a trailer. If a trailer is detected (YES), the method 300 proceeds to determine the length 44 and the width 46 of the trailer 14 so that the exclusion zone 34 can be defined.

Figure 4:
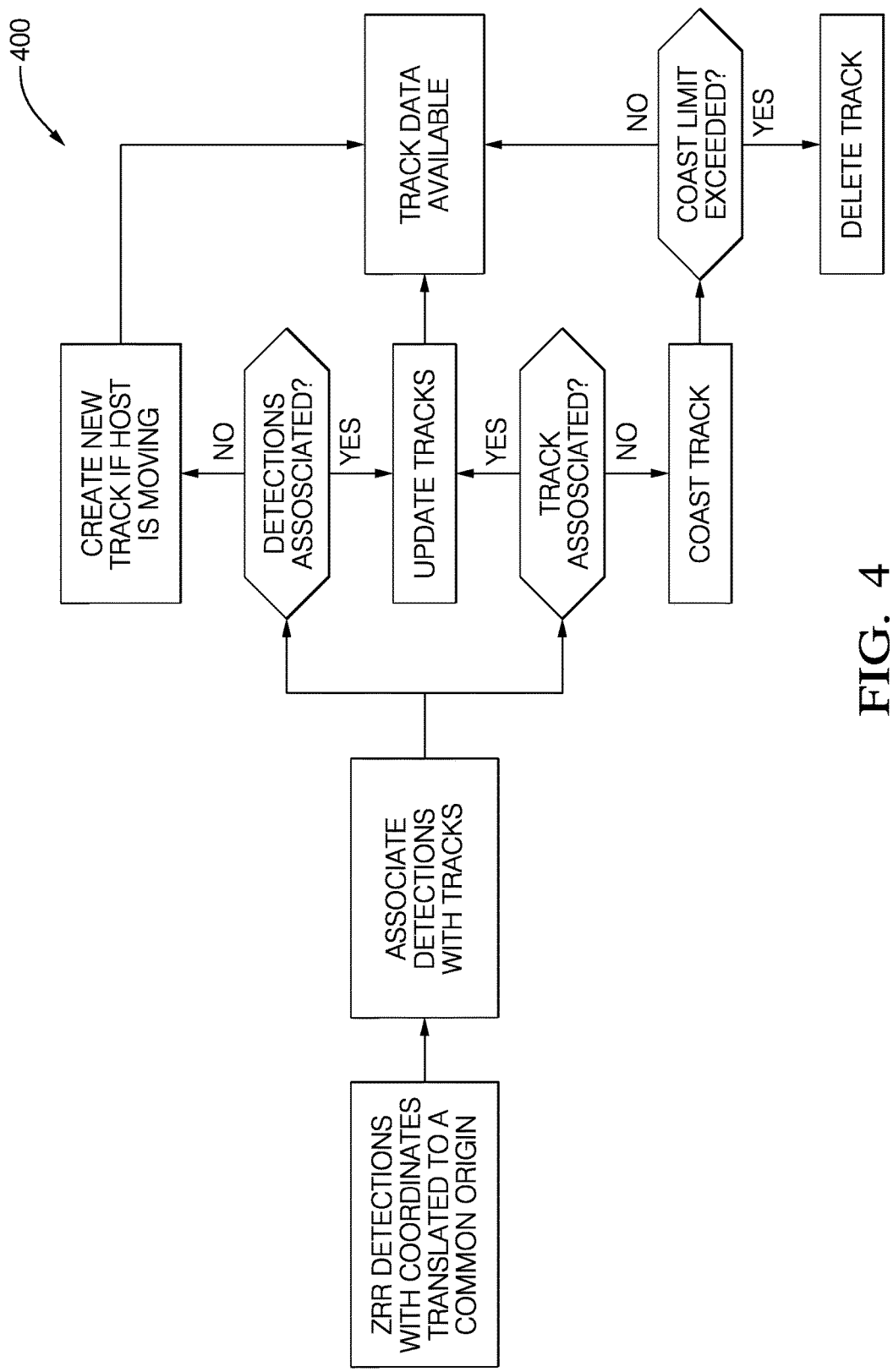
FIG. 4 is flowchart of a method executed by the system of FIG. 1 in accordance with one embodiment.

Step 340, CREATE TIME HISTORY TRACKS FROM ZRR DETECTIONS, may include executing the process illustrated in FIG. 4 which is designated herein as the method 400. When a trailer is present, a ZRR tracker creates a time history of the detections. The radar sensor 20 provides a list of detections where detections are an instantaneous report of each reflection from the detected targets. The report includes data indicative of the detected target's position based on, for example, the range 36 and the angle 38; and the relative rate 42 (a.k.a. range rate). The detection list is then filtered down to just detections that have zero range rates. On each radar cycle the detection list is updated independent of the previous cycle.

The time history is then created by associating each set of new detections with previous detections that were recorded as tracks. Each track will have a unique ID throughout its life. The ZRR tracker may use a four-stage system to designate a status of a track by assigning a numerical value once the track is deemed valid. In this non-limiting example the possible statuses of each of the tracks are: 0—Invalid Track, 1—New Track, 2—New Updated Track, 3—Mature Track, and 4—Coasting Track. The number of tracks may be limited to, for example, sixty-four tracks. At any particular time there may be no ZRR tracks present or up to the defined maximum number of tracks present. An empty track is considered invalid and assigned status-0. A valid track will have a non-zero status assigned to it. When a set of radar detections are complete, every ZRR-detection is compared to every valid ZRR track. The range between the track and the new detection is computed and if it is within some minimum, 0.25 m for example, the detection is associated to the track.

When a ZRR-detection is not associated with a track, the list of tracks is searched for the first open, invalid, track and the detections values are assigned to that track and it is given a status-1, New Track, and an age of one. If the ZRR-detection is associated with a track, the track is updated based upon tracks status and age. A ZRR detection associated with a New Track, the status is updated to status-2, New Updated Track, and the Age is incremented. When a ZRR-detection is associated with a New Updated track the age is looked at and if it exceeds a minimum threshold such as three, the status is changed to status-3, Mature Track, and the age is incremented. If a ZRR-detection is associated with a Mature Track the track remains a Mature Track (status-3) and the age is incremented.

When a track is created the following information may be recorded, but is not limited to: Originating Sensor (Left, Right, or Both), Track ID number, Track Age, Coasting age, Within the bounded area or not, X Position, Y Position, Range, Relative Rate or Range Rate, Angle, Amplitude. After all the ZRR-detections have been compared to all tracks, if a track was not associated, meaning none of the ZRR-detections met the minimum track to detection range requirement, the track status goes to status-4, Coasting Track, the coasting age is set to one and the previous status and its age is remembered. For each subsequent data set where the track is not associated with a ZRR-detection the coasting age is incremented. When a track has coasted for some predetermined period based on its original status it will be deleted and its ID will be available for reuse. For example a status-1 track that coasts, may only coast for 100 ms before it is released, while a status-3, mature tracks that coasts may coast for two seconds before it is released. However, when a coasting track is associated with a new ZRR-detection, the coasting timer is reset to zero and it will return to its previous status and updated as defined above.

Figure 5:
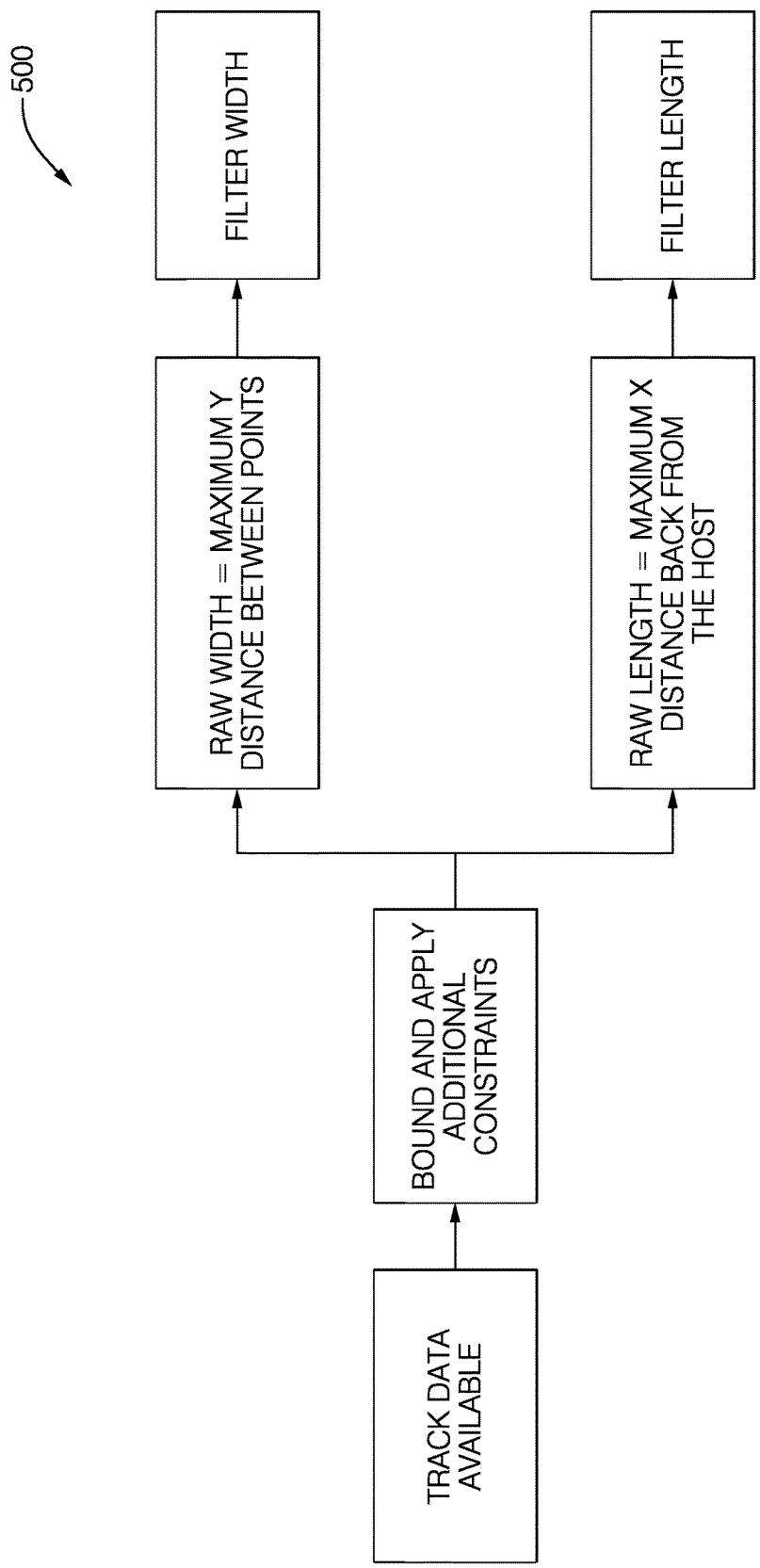
FIG. 5 is flowchart of a method executed by the system of FIG. 1 in accordance with one embodiment.

Step 350, ANALYZE ZRR TRACKS TO DETERMINE THE TRAILER LENGTH AND WIDTH, may include executing the process illustrated in FIG. 5 which is designated herein as the method 500. Using the ZRR tracks the trailers length and width can be determined. Given the track data, each track is compared to a defined bounded area behind the host and only tracks that are within those bounds are used. The boundary is set by calibrations and the current boundary is 8 feet wide and 53 feet in length. Addition constraints such as minimum amplitudes or detections sources may be applied to qualify a track prior to using it to determine the length and width.

After the final track set is determined, the length and width is determined in two steps: Determine the unfiltered (raw) value, and Filter the raw value to the final value. The unfiltered length is determined by taking the maximum X-distance back from the host's rear bumper and the raw width is determined by taking the maximum Y-distance between any two points within the bounded area. The unfiltered measures are then filtered. One way is to use a low pass filter with a long time constant such as five seconds. The second way is to create a histogram of the unfiltered measures where one count is added to the bin that corresponds to the current unfiltered measure and then the bin with the highest counts is selected as the filtered measure. The histogram filter approach appears to create a more stable estimation than the low pass filtered measure.

The output from the trailer detection and sizing algorithm can then be used by other feature running within a Rear Side Detection System (RSDS), i.e. the system 10. For example, the blind spot detection feature can modify its detection zone. First if a trailer is present the blind spot detection feature could modify its detection zone width to prevent false alarms caused by the presents of a trailer. It could also extend the detection zone length to allow warnings when a vehicle is adjacent to the trailer but beyond the host's blind zone area.

By executing the processes or method describe above, the length 44 of the exclusion zone 34 can be determined based on a longitudinal distance to a most-distant target 50 that corresponds to the trailer 14 and is closer to the vehicle 12 than a maximum trailer length (16 m). Similarly, the width 46 of the exclusion zone 34 can be determined based on a lateral distance between a left-most target 52 that corresponds to the trailer 14, and a right-most target 54 that corresponds to the trailer 14.

Accordingly, a radar object detection system (the system 10), a controller 32 for the system 10 and a method 300 of operating the system 10 is provided. The teachings presented herein advantageously improve the performance of the system 10 by defining the exclusion zone 34 to reduce the instances of false-positive detections of objects within an area occupied by a trailer 14 being towed by the vehicle 12.

While this invention has been described in terms of the preferred embodiments thereof, it is not intended to be so limited, but rather only to the extent set forth in the claims that follow.

We claim:

1. A radar object detection system configured to detect objects proximate to a vehicle, said system comprising;
    a radar sensor configured to emit a radar signal toward a defined area proximate to the vehicle, and output a reflection signal indicative of a detected target present in the defined area;
    a controller configured to receive the reflection signal from the radar sensor, determine if the detected target corresponds to a trailer towed by the vehicle, and define an exclusion zone characterized as occupied by the trailer and thereby excluded from the defined area where objects can be detected, wherein the controller is configured to determine if the detected target corresponds to the trailer only when a present speed of the vehicle is greater than a speed threshold.

2. The system in accordance with claim 1, wherein the detected target corresponds to the trailer if a range to the detected target varies less than a variation threshold for greater than a time threshold.

3. The system in accordance with claim 1, wherein the detected target corresponds to the trailer if a range to the detected target is less than a maximum distance threshold.

4. The system in accordance with claim 1, wherein a length of the exclusion zone is determined based on a longitudinal distance to a most-distant target that corresponds to the trailer and is closer than a maximum trailer length.

5. The system in accordance with claim 1, wherein a width of the exclusion zone is determined based on a lateral distance between a left-most target that corresponds to the trailer and a right-most target that corresponds to the trailer.

* * * * *